(12) United States Patent
Gossweiler, III et al.

(10) Patent No.: US 6,422,474 B1
(45) Date of Patent: Jul. 23, 2002

(54) N-SPACE INDEXING OF DIGITAL DATA REPRESENTATIONS USING PHYSICAL TAGS

(75) Inventors: Richard C. Gossweiler, III, Sunnyvale; Kenneth P. Fishkin, Redwood City; Beverly L. Harrison; Anuj Uday Gujar, both of Palo Alto; Roy Want, Los Altos, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/404,734

(22) Filed: Sep. 24, 1999

(51) Int. Cl.[7] .............................................. G06K 19/06
(52) U.S. Cl. ...................... 235/492; 235/375; 235/487; 235/462.15; 703/26
(58) Field of Search ................................. 235/492, 375, 235/383

(56) References Cited

U.S. PATENT DOCUMENTS

| | | | |
|---|---|---|---|
| 3,629,594 A | 12/1971 | Sandberg | 378/95 |
| 5,020,620 A | 6/1991 | Field | 180/169 |
| 5,661,667 A | 8/1997 | Rueb et al. | 364/525 |
| 5,736,967 A | 4/1998 | Kayser et al. | 345/340 |
| 5,751,459 A | 5/1998 | Ohtomo et al. | 359/197 |
| 5,764,138 A | 6/1998 | Lowe | 340/447 |
| 5,786,764 A | 7/1998 | Engellenner | 340/572 |
| 5,832,090 A | 11/1998 | Raspotnik | 380/24 |
| 5,855,969 A | 1/1999 | Robertson | 427/555 |
| 5,905,248 A * | 5/1999 | Russell et al. | 235/462.15 |
| 5,909,176 A | 6/1999 | Schrott et al. | 340/572 |
| 5,918,214 A * | 6/1999 | Perkowski | 235/375 |
| 5,933,829 A * | 8/1999 | Durst et al. | 707/10 |
| 5,943,654 A * | 8/1999 | Goodwin, III et al. | 235/383 X |
| 5,950,173 A * | 9/1999 | Perkowski | 705/26 |
| 6,005,482 A | 12/1999 | Moran et al. | 340/568.8 |
| 6,017,125 A | 1/2000 | Vann | 359/529 |
| 6,057,756 A | 5/2000 | Engellenner | 340/505 |
| 6,107,936 A * | 8/2000 | Zimmerman | 340/825.35 |
| 6,127,928 A | 10/2000 | Issacman et al. | 340/572.1 |
| 6,148,331 A * | 11/2000 | Parry | 283/70 |
| 6,152,369 A * | 11/2000 | Wilz et al. | 235/375 |
| 6,179,206 B1 * | 1/2001 | Matsumori | 235/383 |
| 6,181,885 B1 | 1/2001 | Best et al. | 399/12 |
| 6,256,638 B1 * | 7/2001 | Dougherty et al. | 235/375 |
| 6,326,946 B1 | 12/2001 | Moran et al. | 345/156 |
| 6,330,976 B1 * | 12/2001 | Dymetman et al. | 235/487 |
| 6,345,764 B1 * | 2/2002 | Knowles | 235/375 |

FOREIGN PATENT DOCUMENTS

JP          411025207      *   1/1999

* cited by examiner

Primary Examiner—Michael G. Lee
Assistant Examiner—Allyson Sanders
(74) Attorney, Agent, or Firm—Robert A. Burtzlaff; Joseph M. Yang

(57) ABSTRACT

A system for N-space navigation of digital data sets comprising an electronic tag having a digitally readable identifier, an electronic tag reader configured to read the identifier of the electronic tag, and a computing system connected to the electronic tag reader to provide digital navigation services of N-space data sets in response to reading the unique identifier of each electronic tag.

27 Claims, 7 Drawing Sheets

N-SPACE INDEXING OF DIGITAL DATA REPRESENTATIONS USING PHYSICAL TAGS

FIELD OF THE INVENTION

The present invention relates to indexing complex data sets. More particularly, the present invention relates to use of separate physical identifier tags that store preset or user determined information to assist in N-space indexing and selection.

BACKGROUND AND SUMMARY OF THE INVENTION

Interactive navigation by users of digitally represented data spaces of N dimensions can be difficult due to the complexity of choices, awkward user interfaces, mismatched navigational input devices, or limitations in user memory or skill. For example, a user attempting to interactively comprehend and navigate through a multidimensional digital data set can become easily confused without predefined anchor points that mark known starting points, waypoints, or end points. Such anchor points may include simple time points (e.g. for navigation of audio data); centering on a preferred coordinate axis from a predefined viewpoint (e.g. for navigation of static two dimensional data displays); object centered movable viewpoint (e.g. for "flyby" tracking of rendered three dimensional objects); or viewing of predetermined two dimensional slices of high dimension (e.g. four or more) phase spaces.

The present invention facilitates creation and/or utilization of such navigational anchors in interactive digital environments with the aid of physically distinct electronic tags. Such a system for N-space navigation of digital data sets includes an electronic tag having a digitally or optically readable identifier, an electronic tag reader configured to read the identifier of the electronic tag, and a computing system connected to the electronic tag reader to provide digital navigation services of N-space data sets in response to reading the unique identifier of each electronic tag.

In operation, the digitally readable identifier of the electronic tag can be premarked with suitable graphical, symbolic, or textual indicia and pre-associated with a predetermined digital navigation service. In addition, the tag can be shape or texturally coded for ease of recognition. For example, an electronic tag shaped as a cube or a rectangular solid with identifiable texturing can be color coded or marked with text (e.g. "Start Here", "Yesterday's Work") to simplify association of a user with a desired navigational anchor. Alternatively, an electronic tag can be color coded or marked with text by a user to aid in remembering an interactive association of the electronic tag with a defined digital navigation anchor or service.

In certain embodiments, electronic tag and tag reader systems can be based on temporary direct connection between a tag and a computing system (e.g. a magnetic card strip and card reader, or a small integrated circuit in a "smart card" with associated reader). However, to improve ease of use, in preferred systems the electronic tag is read by the electronic tag reader through a wireless infrared or radiofrequency connection. Because of low cost, use of radiofrequency electronic tags having a semiconductor memory for data storage, processing logic, and a small antenna for broadcasting data, all embedded in rugged epoxy, thermoplastic, or other suitable plastic containers, is preferred. Data storage capacity for such radiofrequency electronic tags typically ranges from a few bits to many kilobits, with 64 bits being typical. Tags can include read only memory (ROM), electrically programmable or erasable (EPROM and EEPROM), or even flash memory. An electronic tag can be powered by a long lasting small battery, photovoltaic power, thermal converter, inductive power converter that relies on externally applied electromagnetic energy, or any other suitable power supply.

In operation, at least one electronic identification tag is affixed to each physical item that is associated with digital navigation services. These tags can be small radio frequency transponders comprised of an integrated circuit, containing a unique user accessible 39-bit identification number. A small coil inductively powers the tag, and an antenna is used to broadcast the identification number. In certain embodiments, the antenna can be separate from the coil, or alternatively, a dual-use inductive power coil/antenna coil can be used. In such preferred inductive based tags, no battery or other on-board power source is required, with energy being transferred from the inductive coil to the electronic tag.

A tag reader that includes transmitter and receiver components is affixed to a computational device. The tag reader momentarily energizes the tag through its coil until it has sufficient power for transient transmission of its identification number. The communication between tag and tag reader only occurs when both are proximate, with an actual distance varying based on size of the antenna attached to the tag and to the transmitter, from a distance of a few inches to that of several feet. Once the identification number (transmitted serially) is received, the tag reader passes this on to the computer system as an ASCII string, via a serial RS-232 output or some other suitable connection, while simultaneously providing user feedback to confirm reading of the electronic tag. User feedback can be visual (e.g. blinking or turning on an LED status light, text based or iconic display presentations), auditory (e.g. an audible buzz or beep), tactile (e.g. a button being raised or a perceptible structure rotation), or combinations of the foregoing.

Upon receipt of the identification number, the computing system interprets the identification input string, determines the current application navigational context, and provides appropriate digital services. For example, an ASCII database that maps identification numbers to one or more presaved navigational viewpoints in a rendered three dimensional data workspace can be used. One common action is a {program, navigational viewpoint} pair that invokes the identified program at an associated navigational viewpoint. If the received navigational viewpoint has not been previously registered, i.e. associated with an action in the ASCII database, the user can be prompted to enter associated parameters via a dialog box. Alternatively, in certain preferred embodiments users navigate to the desired location, move a previously unregistered tag past a reader, and allow electronic tag data to be automatically set to the displayed location.

As those skilled in the art will appreciate, each identification number or sensed data value that is read (sensed) by the tag can be labeled as a "command", with a particular digital service or attribute being associated with each command. Although the wide variety of easily distinguishable commands (e.g. identification numbers) would alone provide a powerful user interface to a computer, the present invention further extends the flexibility of the command based user interface by supporting computer control based on a multiple command input, with temporally synchronous (or overlapping asynchronous) tuples of one or more commands (e.g. particular identification numbers and sensed states) being read by the tag reader. Single and multiple commands can in turn be extended by participation in a "sentence". A sentence is defined as a sequence of one or more temporally disjoint commands or command tuples. The sentence level allows definition of a input grammar by appropriate choice of command sequence, and corollary rules governing, for example, use of active verb-like commands (e.g. "go to", "zoom-in", "rotate"), naming noun-like commands (e.g. DOC1.TXT, "yesterday's viewpoint"), or connectors (e.g. AND).

In effect, the present invention provides a method for transferring complex instruction sequences and information from one or more electronic tags to an electronic tag reader connected computer. The method comprises the steps of manipulating one or more tags to provide a first command input (that includes the tag identification number) to the computer, with the first command input normally triggering a first default action by the computer. The tagged object may also be manipulated to provide a second command input (again including a tag identification number) to the computer, with the second command input converting the normally triggered first default action to a second action. The first and second commands (and any subsequent commands) together form a sentence that can be interpreted as a command to implement a computer controlled navigational service. In operation, for example, the sentence "establish authorization, open my computer desktop as I saved it a week ago, and step through views of the daily desktop changes until today's desktop is shown" can involve the sequential steps of reading a first tag embedded in a picture identification card to establish user identification, immediately presenting a second tag clipped to a first navigational card marked by a user with last week's date, and finally presenting a second premarked navigational card preassociated to step through views from an initial desktop view to the last saved view.

The present invention is of particular use in conjunction with navigation of audio streams or video streams. Particular points of interest in an audio or video stream can be associated with a physical tag by a user, and later returned to for listening, visual inspection, or editing. Sequences of static images such as documents can also be navigated using the present invention. For example, an electronic tag can act as a electronic bookmark that allows a user to directly bring up a desired page, or alternatively, transition to a bookmarked page through transient presentation of a book cover image, title page, and chapter page to help establish context for a user.

The present invention is also of particular use in navigating complex three dimensional or higher (N=3 or higher) data spaces, where reacquiring previously found preferred viewpoints can be difficult. Again, various graphical transition techniques can be employed to help preserve user viewing context when moving between an initial viewpoint position and a final viewpoint position.

Additional functions, objects, advantages, and features of the present invention will become apparent from consideration of the following description and drawings of preferred embodiments.

DETAILED DESCRIPTION OF THE DRAWINGS

Figure 1:
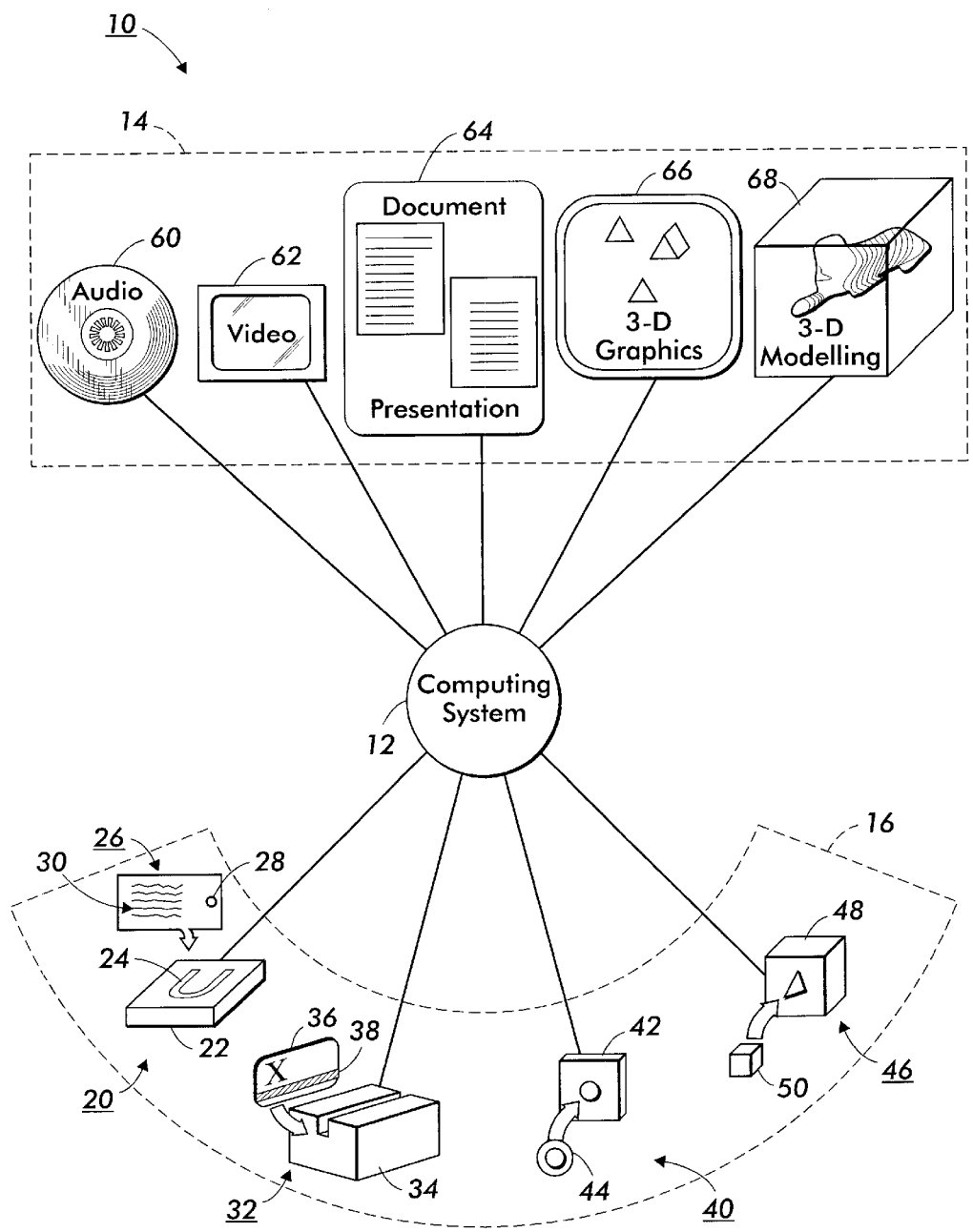
FIG. 1 is a schematic diagram of a system utilizing physical aids for N-space navigation of complex data sets, including audio, video, and three dimensional output.

FIG. 1 is a schematic diagram of a system 10 for identifying multiple electronic tags generally having a locally unique electronically readable identification number and providing various digital navigation services in response electronic tag reading systems 16. System 16 can include radiofrequency based systems 20, magnetic strip card based systems 32, infrared based systems 40, or optical character/bar code based systems 46. Such electronic tag systems allow for access to digital navigation systems 14, by use of respective electronic tag readers 22, 34, 42, and 48) connected to a computing system 12, which may include a local embedded, handheld or desktop computer, database servers, and networked computers. When electronic tags 26, 36, 44, or 50 are brought near suitable tag readers, information is read from the electronic tags and the locally unique identification number of the electronic tag is passed to the computing system 12, which in turn mediates navigational control of systems 14.

Digital navigation systems 14 can include, but are not limited to, navigational control of audio data systems 60; navigational control of video data systems 62; centering on a preferred coordinate axis from a predefined viewpoint for navigation of static two dimensional data display systems 64; object centered movable viewpoint for "flyby" tracking of rendered three dimensional objects in rendered 3-dimensional graphical viewing systems 66; or control of physical or optical (e.g. holographic) 3-dimensional viewing systems 68.

Electronic tag systems 16 in accordance with the present invention generally include a tag that broadcast a unique identification number and optional data at various selected optical or radiofrequencies. The identification number can be user assigned at electronic tag activation, user modifiable by software command, or fixed by an electronic tag manufacturer, depending on the particular memory system employed. In certain embodiments, infrared, ultrasonic, or other suitable data transfer systems may be used alone or in combination with radiofrequency tags to transmit unique identification numbers or associated data. The electronic tags can be inductively powered by external electromagnetic coils, powered by internal batteries, powered by photovoltaic cells, powered by trickle currents from household current when available, or any other suitable power mechanism. Broadcast of the identification number and/or data can be continuous, intermittent, in response to external status inquiries, at random intervals, or in response to local powering of the electronic tag.

For example, implementation of a radiofrequency electronic tag reading system 20 is possible using commercially available tags 28 imbedded in a bookmark 26 having a user writable surface 30 for preapplied or user applied marking. The tags are available from Trovan, Ltd., having a website at <www.trovan.com> (hereinafter "Trovan") as is a tag reader 22 having an inductive coil 24. A Trovan tag 28 consists of a small coil and a tiny microchip connected to the coil. The coil 24 inductively powers the tag and broadcasts tag identification information. A Trovan tag is inductively powered by coil 24, with power being transferred to the tag from the reader 22 at each interrogation cycle. Typically a reader 22 will initiate an interrogation cycle by generating a field alternating at a frequency of 128 kHz. If it is close enough to a tag, the changing field will induce a current in the coil contained in the tag. This current can be rectified and used to charge a capacitor that after sufficient time will have enough stored charge to power its attached integrated circuit. When this condition is met, the chip will activate an oscillator at half the interrogation frequency and this signal is fed back into to the tag coil. The tag reader 22 is designed as a full duplex system—it can receive and transmit concurrently. The reader's sensitive receiver is tuned to exactly half of the interrogation frequency and is listening for a phase-modulated signal from the tag at 64 kHz. During this process the tag will modulate the response signal with a data frame containing 64 bits of information. Each frame will contain an organization or client code, a unique ID code and a checksum. For each client, $2^{39}$ tagging codes are available (approx. 550 billion).

Various sized Trovan tags can be used in the present invention. Larger tags contain a larger coil, but have similar electronics to the smaller versions. Larger tags have a greater read range. The tradeoff between tag size, reader coil size, and read range is governed by the application. The following reader and tags have been tested in system 100: LID 656 tag reader; ID 100A—cylinder tag (2.2×11.5 mm); ID 200—round tag (25.5 mm(dia),4.5 mm (thick)); ID 300—round tag (25 mm(dia), 4.8 mm (thick)); and ID 400—credit card size and shape. Reading distance typically ranges from contact to as much as 12 centimeters when an electronic tag is unshielded and fully enabled.

As will be understood, the various electronic tag systems can be constructed to detect electromagnetic, optical, or acoustic signals. For example, tag reading system 32 includes a tag 36 with a magnetically readable electronic strip 38, for use in conjunction with a magnetic strip reader/writer 34. Tag reading system 40 is infrared based, using IrDA standard signaling protocols to transmit an identification number. System 46 is optical based, and can use color recognition (various colored sides of a cube 50) or alternatively, recognition of bar codes on the surface of cube shaped tag 50.

As will be appreciated, in certain embodiments, the tag reader can write as well as read electronic tag identification numbers and data. This allows a user to interactively provide unique identification numbers and/or supply additional data for immediate association with the tag. It will also be understood that the particular digital service invoked in response to reading a tag can depend on state of the tag reader, the order in which electronic tags are read by one or more of the electronic tag reader, the duration of presentation of an electronic tag to a particular reader, or any other suitable electronic tag reading protocol.

After an electronic tag is read, the computing system 12 is used to interpret the identification number of the electronic tag and provide the requested digital service. Semantic binding of the identification number can be provided by computing system 12 (e.g. a desktop computer, a dedicated electronic tag processor, a hand holdable pen computer, by networked connected database servers, or by other accessible networked computers). Computers in computing system 12 can be interconnected by various hard wired or wireless connections, and may support various communication protocols and designs, including use of a serial tethered (using, for example the RS-232C interface protocols), use of infrared signals adhering to widely utilized IrDA communication standards, or use of radiofrequency signals (which can be, for example, a cellular telephone, 900 MHz radio, or digital PCS telephonic communications). Alternative communication standards, or even alternative communication carriers such as those based on optical or acoustic techniques, can of course be employed. Other possible communication targets for computing system 12 include automation control systems, security authorization units, wireless personal digital assistants, notebook computers, or any other suitably equipped electronic system.

Binding digital services to particular electronic tags can be user defined, provided as default bindings by a system provider, learned by the system through repetition or context, or some combination of these and other suitable semantic binding techniques. For example, a database format can be constructed in which each identification number of an electronic tag is a database key. Associated with that key is a set of digital actions to undertake when that identification number of an electronic tag is detected. There is an enumerated list of such actions—display a Web page, display a text document, display a date in a calendar, go to a certain location in a document, and so forth. Each action is parameterized by a list of (name, value) pairs appropriate for that action. For example, the action to display a text document has pairs associated with it indicating the file to display, whether it should display in read-only mode, or whether the file should be converted to a particular format. By using this general (name, value) mechanism, and having the database be in human-readable ASCII form, a user can easily add new tags and new types of actions to an initially provided list. Since the database is editable, associations between identification numbers of electronic tags and digital services can be modified at any time by a user.

In addition to reading a single electronic tag and its unique identification number, the user interface of the present invention can be extended by sequentially or simultaneously reading multiple electronic tags from one or more tag readers. As those skilled in the art will appreciate, each identification number or sensed data value that is read (sensed) by the tag can be labeled as a "command", with a particular digital service or attribute being associated with each command. Although the wide variety of easily distinguishable commands (e.g. identification numbers) would alone provide a powerful user interface to a computer, the present invention further extends the flexibility of the command based user interface by supporting computer control based on a multiple command input, with temporally synchronous (or overlapping asynchronous) tuples of one or more commands (e.g. particular identification numbers and sensed states) being read by the tag reader. Single and multiple commands can in turn be extended by participation in a "sentence". A sentence is defined as a sequence of one or more temporally disjoint commands or command tuples. The sentence level allows definition of a input grammar by appropriate choice of command sequence, and corollary rules governing, for example, use of active verb-like commands or naming noun-like commands.

In effect, commands taken together form a sentence that can be interpreted as a command to implement a computer controlled action (i.e. digital service), whether it be to open and print a particular electronic document, unlock an electronically controlled door in response to a tag conveyed personal identification number, display a graphical image on a computer display, or begin logging on to a computer network. As will be appreciated by those skilled in the art, some temporally distinguishable commands (or combinations of commands) further represent commands used as a basis for a grammar in accordance with the present invention. All of the following described commands can be modified by numerous variations in identity of electronic tag (e.g. tag number 237654 vs. 124934), class of electronic tag (e.g. the 1000 series versus the 4000 series), presentation of sequence of particular electronic tags, repetition or timing variations in tag presentation or sequencing, as well as sensor input such as positional information, applied pressure, force utilized in squeezing a pressure sensor. In addition, timing of various objects (whether quick, slow, or alternately quick and slow) can modify interpretation of a command.

The software infrastructure in computing system 12 to support such functionality typically includes a single thread of a multi-threaded program, and can be easily written by one skilled in the art. For example, the computing system 12 is connected by a serial port to a tag reader 22. The computing system 12 monitors this serial port for incoming tag identification numbers. A second thread is notified of each incoming tag and displays the appropriate navigation service. In effect, the software layer reads the incoming tag identification numbers, examines the associated tag file, which contains the mapping of identification numbers to navigational actions, and then executes the desired command sequences to invoke selected digital services. Sometimes the same tag will be rapidly detected twice: to filter this out, a hysteresis is imposed on each tag event. If a tag identification number is detected which is not associated with any semantics, the program can either ignore the tag, or launch a dialog box querying the user for the semantics of the tag. The latter mechanism is used to update the computing system whenever a new tag is presented. Ordinarily a shared network database is used to map digital services to each tag identification number.

Figure 2:
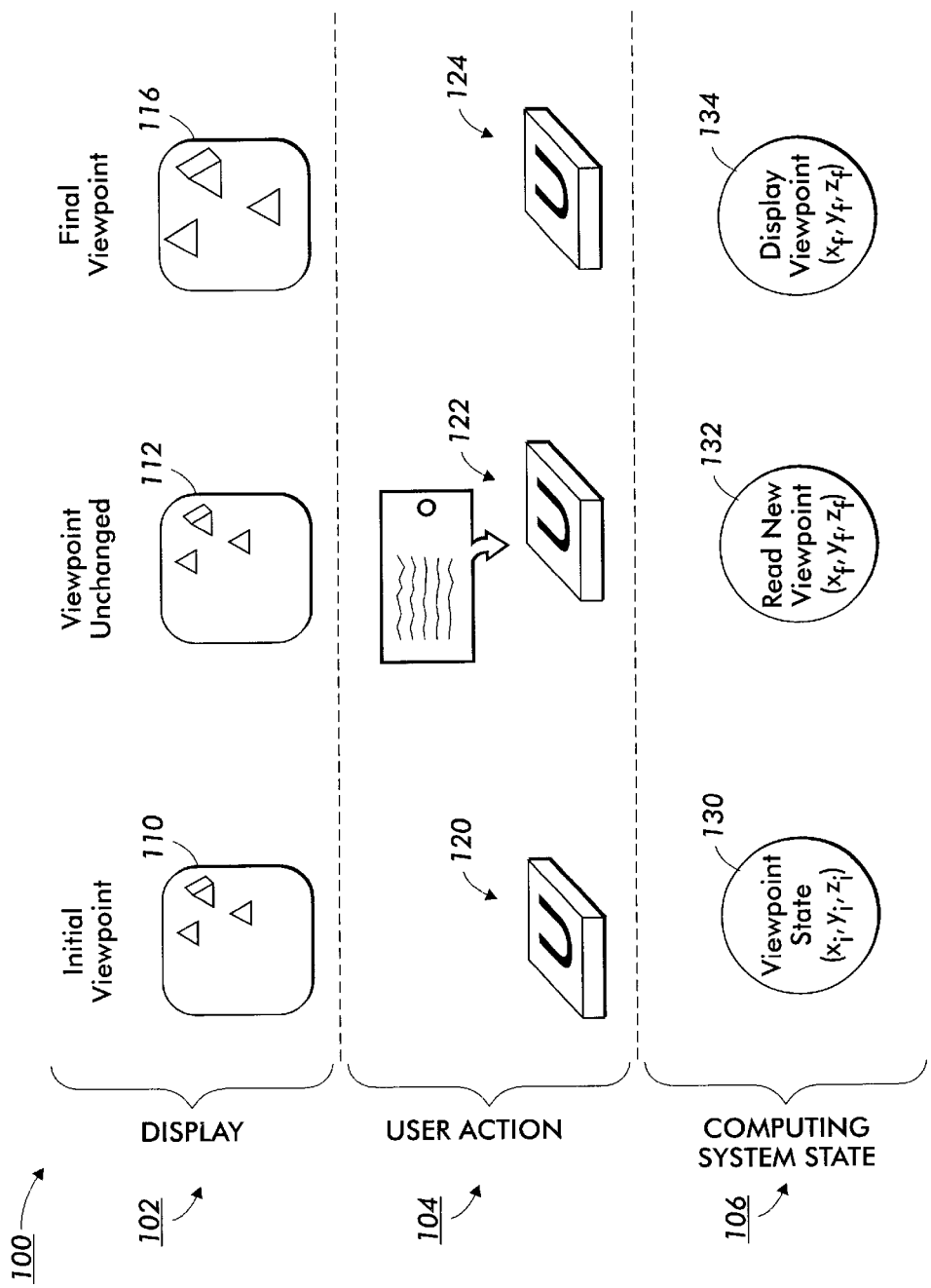
FIG. 2 is an illustration of respective display, user action, and computing system state as a physical tag is used for viewpoint navigation.

To better understand operation of the present invention for navigational purposes, FIG. 2 schematically illustrates use of tag based navigation system 100 for navigation of a rendered digital data space. FIG. 2 includes temporally successive representations of display 102, user action 104 resulting in the display 102, and computing system state 106 required to form the display 102 in response to user action 104. For example, an initial viewpoint 110 (showing a number of rendered triangles in a virtual space from a defined viewpoint) is displayed in the absence of any input from an electronic tag system 120. The computing system maintains an initial viewpoint state 130 resulting in display 110. When user action 122 brings an electronic tag with a unique identifier in the vicinity of a tag reader, the unique identification is read and associated with a new viewpoint 132, while display 112 remains unchanged. The computing system state changes (state 134) to call for immediate replacement of the initial display with display of the final viewpoint 114, absent any further user input 124 to the tag system.

Figure 3:
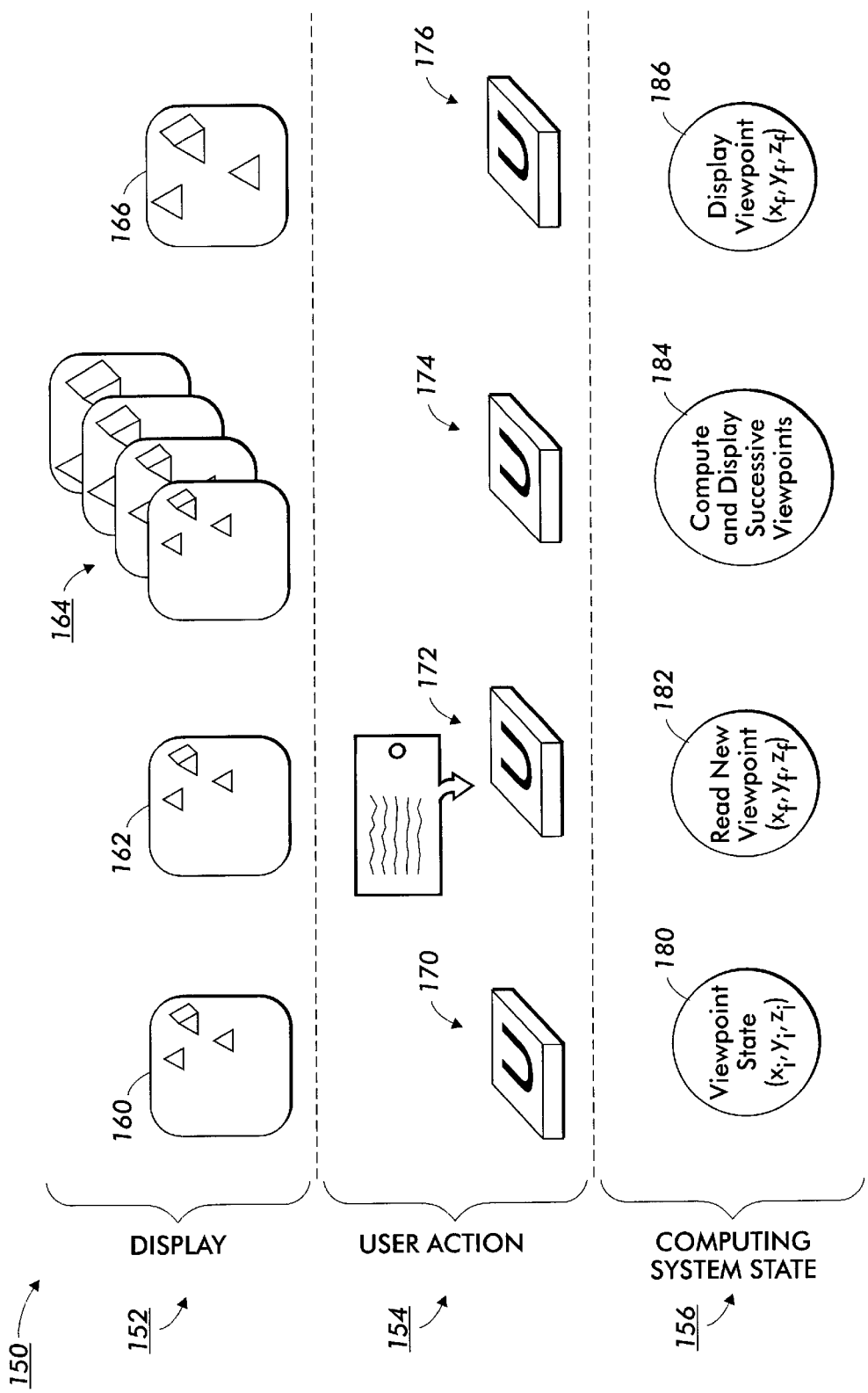
FIG. 3 is an illustration of respective display, user action, and computing system state as a physical tag is used for viewpoint navigation in conjunction with "fly by" rendering to maintain viewpoint context.

To aid in preserving user orientation during navigation of virtual space, the foregoing system can be improved as illustrated in FIG. 3. FIG. 3 schematically illustrates use of tag based navigation system 150 for navigation of a rendered digital data space. FIG. 3 includes temporally successive representations of display 152, user action 154 resulting in the display 152, and computing system state 156 required to form the display 152 in response to user action 154. For example, an initial viewpoint 160 (showing a number of rendered triangles in a virtual space from a defined viewpoint) is displayed in the absence of any input from an electronic tag system 170. The computing system maintains an initial viewpoint state 180 resulting in display 160. When user action 172 brings an electronic tag with a unique identifier in the vicinity of a tag reader, the unique identification is read and associated with a new viewpoint 182, while display 162 remains unchanged. The computing system state changes (state 182) to read the new desired viewpoint. In contrast to the system illustrated in FIG. 2, instead of immediately replacing of the initial display with display of the final viewpoint, the computing system state 184 computes and successively displays (display 164) a series of transitional views to the final display 166 from final display viewpoint 186. The tag reader state 174 and 176 is unchanged during this transitional display. Advantageously, this display transition mechanism helps users retain orientation in virtual spaces.

Figure 4:
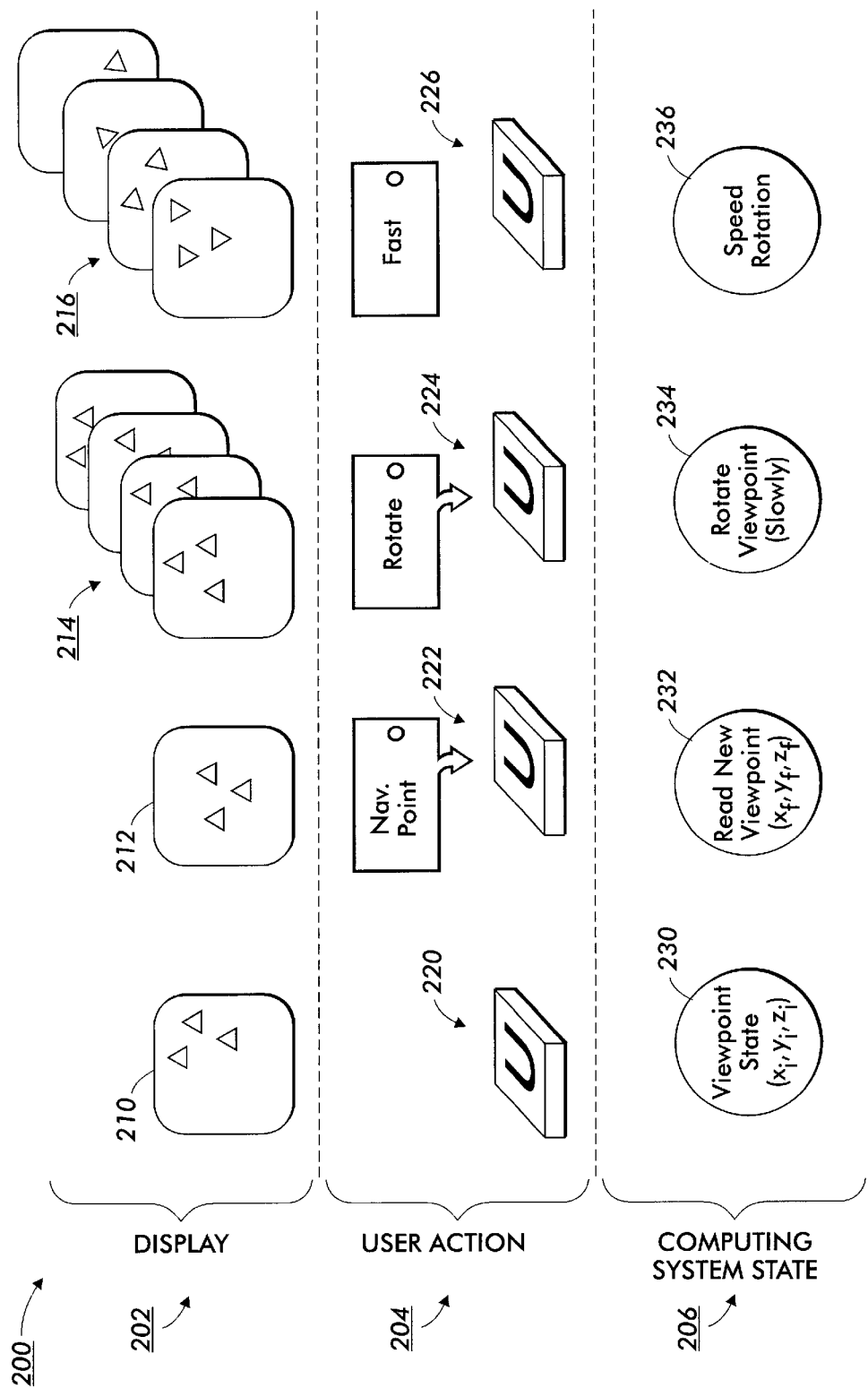
FIG. 4 is an illustration of respective display, user action, and computing system state as multiple physical tags are sequentially used.

As will be appreciated, display navigation using multiple electronic tags can include concatenations of viewpoint states or action commands. As seen in FIG. 4, tag based navigation system 100 for navigation of a rendered digital data space. FIG. 4 includes temporally successive representations of display 202, user action 204 resulting in the display 202, and computing system state 206 required to form the display 202 in response to user action 204. For example, an initial viewpoint 210 (showing a number of rendered triangles in a virtual space from a defined viewpoint) is displayed in the absence of any input from an electronic tag system 220. The computing system maintains an initial viewpoint state 230 resulting in display 210. When user action 222 brings an electronic tag with a unique identifier in the vicinity of a tag reader, the unique identification is read and associated with a navigation viewpoint 232, and display 212 is changed in accordance with the new viewpoint. A user then brings another tag 224 having a unique identification number semantically linked with rotation of a viewpoint at a predefined speed, resulting in a series of images as seen in display 214 as directed by computing system state 234. When the user employs a "modifier" tag (fast card 226), the computing state 236 changes to speed up rotation of display 216.

Figure 5:
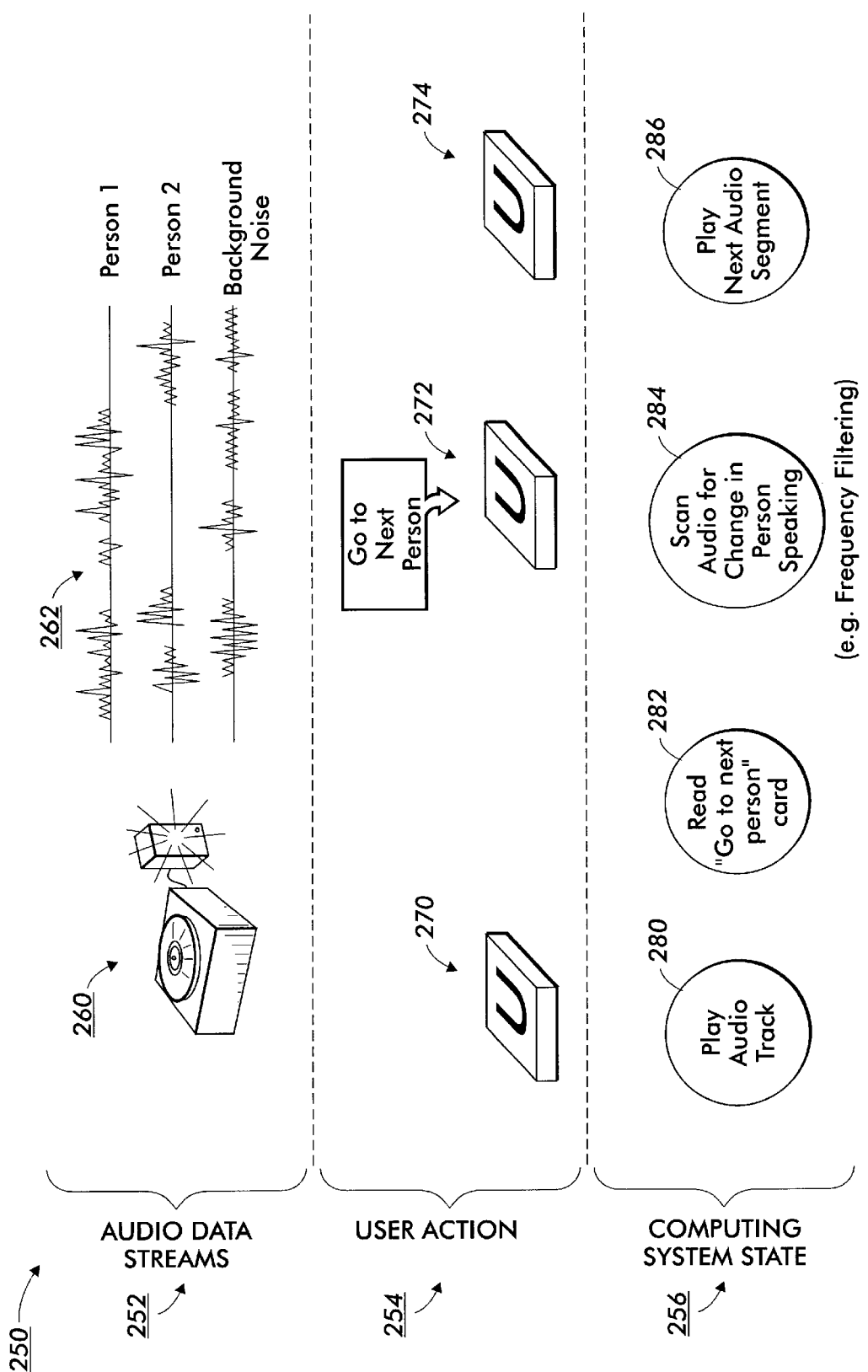
FIG. 5 is an illustration of respective display, user action, and computing system state as a physical tag is used for navigation of audio systems.

In addition to visual navigation, navigation of audio (one dimensional space for a single audio track, multiple dimensions when multiple audio tracks are considered) is also possible. As seen in FIG. 5, schematically illustrates use of tag based navigation system 250 for navigation of a audio space. Figure includes temporally successive audio stream 252, user action 154 resulting in the changes to playback of audio data, and computing system state 256 required to adjust audio playback in response to user action 254. For example, an audio soundtrack having "person 1" and "person 2" speaking is provided by audio playback unit 260 (with waveforms 262 resulting) in the absence of any input from an electronic tag system 120. The computing system maintains an initial audio playback state 280. When user action 272 brings an electronic tag with a unique identifier in the vicinity of a tag reader, the unique identification is read and associated with command to "go to next person",. The computing system state changes (state 282) to scan (284) the audio data for changes in person talking (i.e. person 1 changes to person 2, or person 2 changes to person 1). In the final state illustrated in the Figure, the audio data stream is advanced and no further user action (274) is required.

Figure 6:
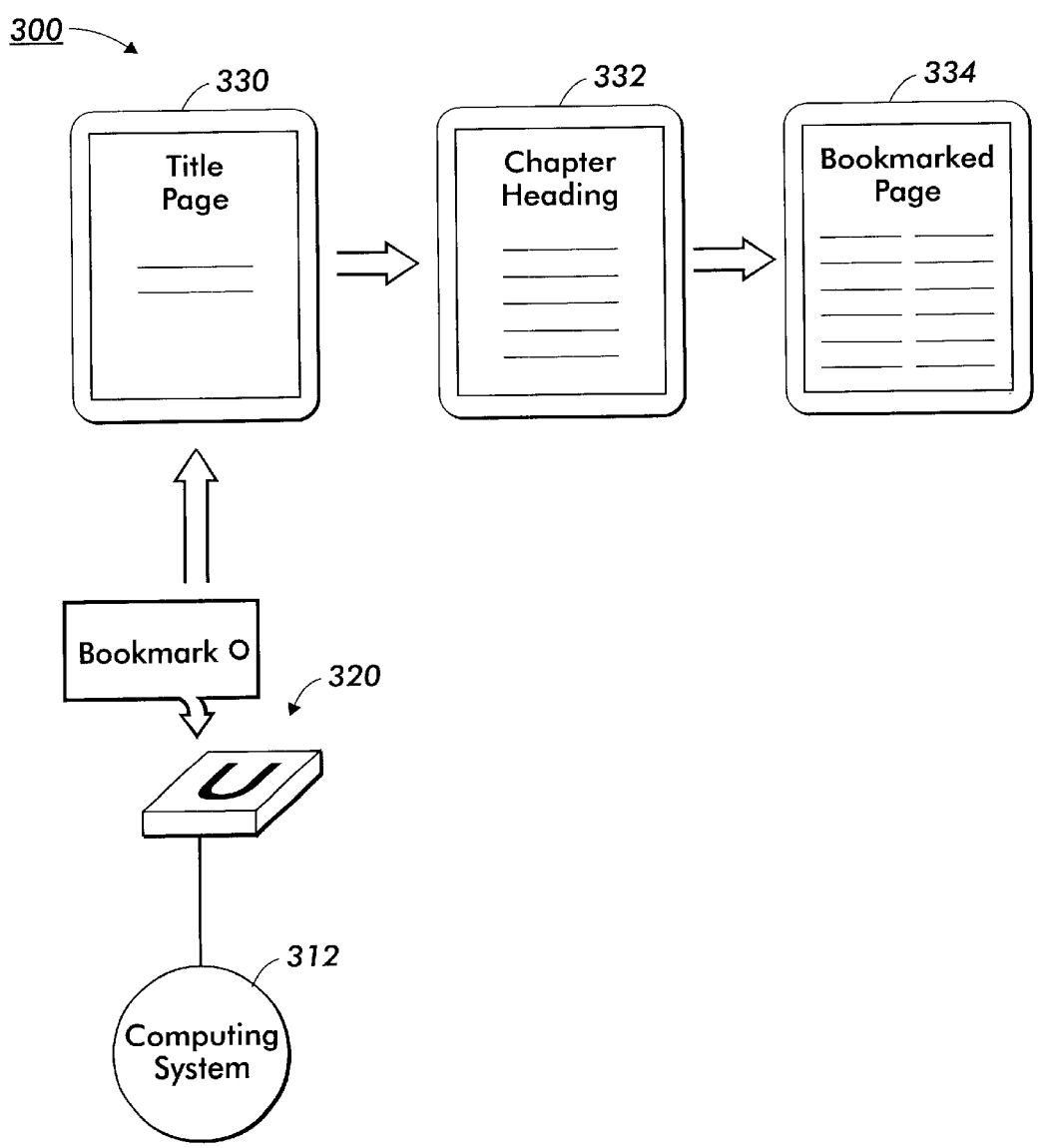
FIG. 6 is an illustration of respective display, user action, and computing system state as a physical tag is used for navigation of a document filing system.

In another embodiment of the present invention, navigation that illustrates data hierarchically arranged is possible. As seen in FIG. 6, an electronic bookmark system 300 that includes a user definable bookmark tag system 320 on computing system 312 can be used to return to electronically bookmarked pages. To help preserve user orientation during navigation, the display 330 quickly displays a title page for the electronic book, followed by the chapter heading 332 and the actual bookmarked page 334. This or similar hierarchical navigation sequences help to preserve user orientation.

Figure 7:
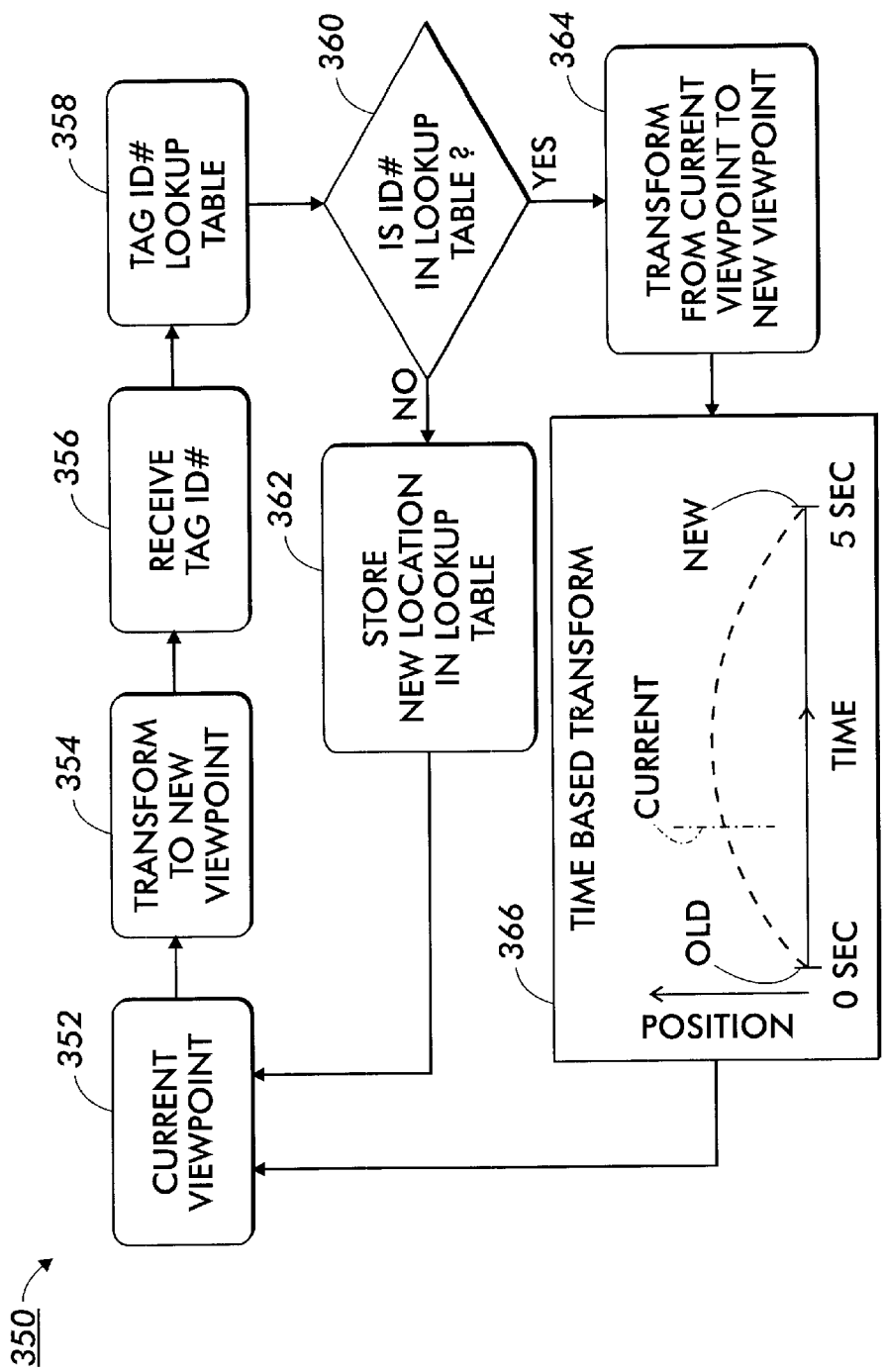
FIG. 7 is a flow chart illustrating program logic in a system utilizing physical aids for 3-space navigation (two dimensionally rendered) using viewpoints.

To better illustrate operation of the present invention, a schematic flowchart illustrating program flow for virtual space navigation is illustrated in FIG. 7. Software in accordance with the flowchart 350 was written in C++ using OpenGL for the 3D graphicslibrary, and is capable of running on a PC both in Windows95 and Windows NT 4.0. An OpenGL compliant 3D graphics card was used to hardware accelerate the 3D graphics.

The application begins by rendering a 3D graphics scene from a current viewpoint 352 to new viewpoints 354 using openGL graphics calls. The application then spawns a second thread (another little application). This second thread opens the serial port, connects with the tag-reading input device and issues reading commands. It receives the results of the reads (box 356) and sends this information back to the main application. This information is the unique ID of the card that passed over the reader. If no card is present, nothing is communicated to the main application.

The main application is event-driven. It reads input events such as those coming from navigation instructions via the keyboard, mouse. For example, pressing the "Z" key flies the camera forward over the 3D terrain it is rendering. Consequently the scene graph is made up of the scene and a camera which flies over the scene and has a particular position and orientation at any moment in time.

When the main application receives an event from the spawned thread, it reads the unique id, time-stamps the event and looks up the ID in a lookup table (box 358 and 360). The table is a software array holding unique IDs as keys and commands to execute as values. If the software does not find the ID in the table, it adds the ID to the table and stores the camera position/orientation in the value slot (box 362). This may be described as the "record" stage. The next time the ID is read, it will be found in the lookup-table. The camera will then be animated from its current position and orientation to the new position and orientation. This may be described as the "playback" or "action" stage. Initially, the table is empty, except for "pre-wired" cards. These cards IDs' are stored in the table with preset commands (such as move forward 1 meter):

Example Table:

| ID | I COMMAND | |
|---|---|---|
| 12345678 | I R 0,0,1,0,0,0 | // move forward Relative 1 in Z direction |
| 22222222 | I R 0,1,0,0,0,0 | // move forward Relative 1 on Y direction |
| 33333333 | I R 0,0,0,10,0,0 | // rotate relative 10 degrees around X axis |
| 44444444 | I M 10,20,30,40, 50,60 | // move absolute; loaded from ID tag |
| 0 | I M 0,0,0,0,0,0 | // empty slot |

To move the camera from its current position to a new position (box 364), the camera's position is interpolated. That is, the camera starts at a particular X,Y,Z position and RX, RY, RZ rotation. It needs to get to a new position, X2, Y2, Z2, etc. within some time interval (e.g. 1 second). The program computes (box 366) the start time and the amount of time that has passed. This amount-of-time-passed is compared to the duration (e.g. 1 second). If a linear interpolation is used, then when the amount-of-time-passed is one half of the duration (e.g. 0.5 seconds), then the camera should be half way between its start position (X) and its final position (X2). Typically, an acceleration path, rather than a simple linear path is used. So in the beginning, it does not move very much, then in the middle it moves very fast and at the end it slows down again.

As those skilled in the art will appreciate, other various modifications, extensions, and changes to the foregoing disclosed embodiments of the present invention are contemplated to be within the scope and spirit of the invention as defined in the following claims.

What is claimed is:

1. A system for N-space navigation of digital data sets, comprising:

an electronic tag associated with at least one digital navigation service, the electronic tag having a digitally readable identifier;

an electronic tag reader configured to read the identifier of the electronic tag; and a computing system connected to the electronic tag reader to provide digital navigation services of N-space data sets in response to reading the unique identifier of each electronic tag, wherein N is at least 2.

2. The system of claim 1, wherein the digitally readable identifier of the electronic tag is pre-associated with a predetermined digital navigation service.

3. The system of claim 1, wherein the digitally readable identifier of the electronic tag is associable by a user with a defined digital navigation service.

4. The system of claim 1, wherein the electronic tag is premarked.

5. The system of claim 1, wherein the electronic tag presents a surface for user defined annotation.

6. The system of claim 1, wherein the electronic tag is read by the electronic tag reader through a wireless connection.

7. The system of claim 6, wherein the wireless connection operates at radiofrequencies.

8. The system of claim 6, wherein the wireless connection is infrared.

9. The system of claim 1, wherein the N-space data sets are N-space audio data sets.

10. The system of claim 1, wherein the N-space data sets are N-space video data sets.

11. The system of claim 1, wherein the N-space data sets are N-space document data sets.

12. The system of claim 1, wherein N is at least 3.

13. The system of claim 10, further comprising a device separate from and operably connected to the computing system, wherein the computing system does at least one of repositioning the device and reorienting the device upon receiving the identifier from the tag reader.

14. A method for navigating N-space data sets, comprising:

rendering a first display on a screen of a computer;

reading an electronic tag identifier with an electronic tag reader; and rendering a second display on the screen, the second display corresponding to the electronic tag identifier.

15. The method of claim 14 further comprising looking for the tag identifier in a table stored in memory; and adding the identifier to the table when the identifier is not found in the table.

16. The method of claim 14 wherein the N-space data sets are N-space video data sets.

17. The system of claim 14, wherein the N-space data sets are N-space document data sets.

18. The system of claim 14, wherein the N-space data sets are N-space audio data sets.

19. A method for electronically bookmarking a particular point of interest in a data stream;

encoding an electronic tag with an identifier;

associating a particular point of interest in a data stream with the electronic tag identifier;

reading the electronic tag identifier with an electronic tag reader; and rendering a two-dimensional portion of the data stream corresponding to the electronic tag identifier on a screen.

20. The method of claim 19, wherein the data stream is a visual data stream.

21. The system of claim 19, wherein the data stream is an audio data stream.

22. The system of claim 19, wherein the data stream is a document data stream.

23. A system for navigating a space of a data set having three or more dimensions, comprising:

an electronic tag associated with at least one digital navigation service, the tag having a digitally readable identifier an electronic tag reader that includes transmitting and receiving components, wherein the electronic tag reader is configured to read the identifier of the electronic tag by transmitting signals to and receiving signals from the electronic tag when the two are proximate to each other, a computational device connected to the electronic tag reader to provide digital navigation services of the space in response to reading the unique identifier of each electronic tag.

24. The system of claim 23, wherein the N-space data sets are N-space audio data sets.

25. The system of claim 23, wherein the N-space data sets are N-space document data sets.

26. The system of claim 23, wherein the N-space data sets are N-space video data sets.

27. The system of claim 26 further comprising a device separate from and operably connected to the computational device, wherein the computational device does at least one of repositioning the device and reorienting the device upon receiving the identifier from the tag reader.

* * * * *